July 7, 1931.  J. R. KLIN  1,813,298
PROVISION BOX
Filed Sept. 19, 1928    6 Sheets-Sheet 2

INVENTOR
John R. Klin
BY
Toulmin + Toulmin
ATTORNEY

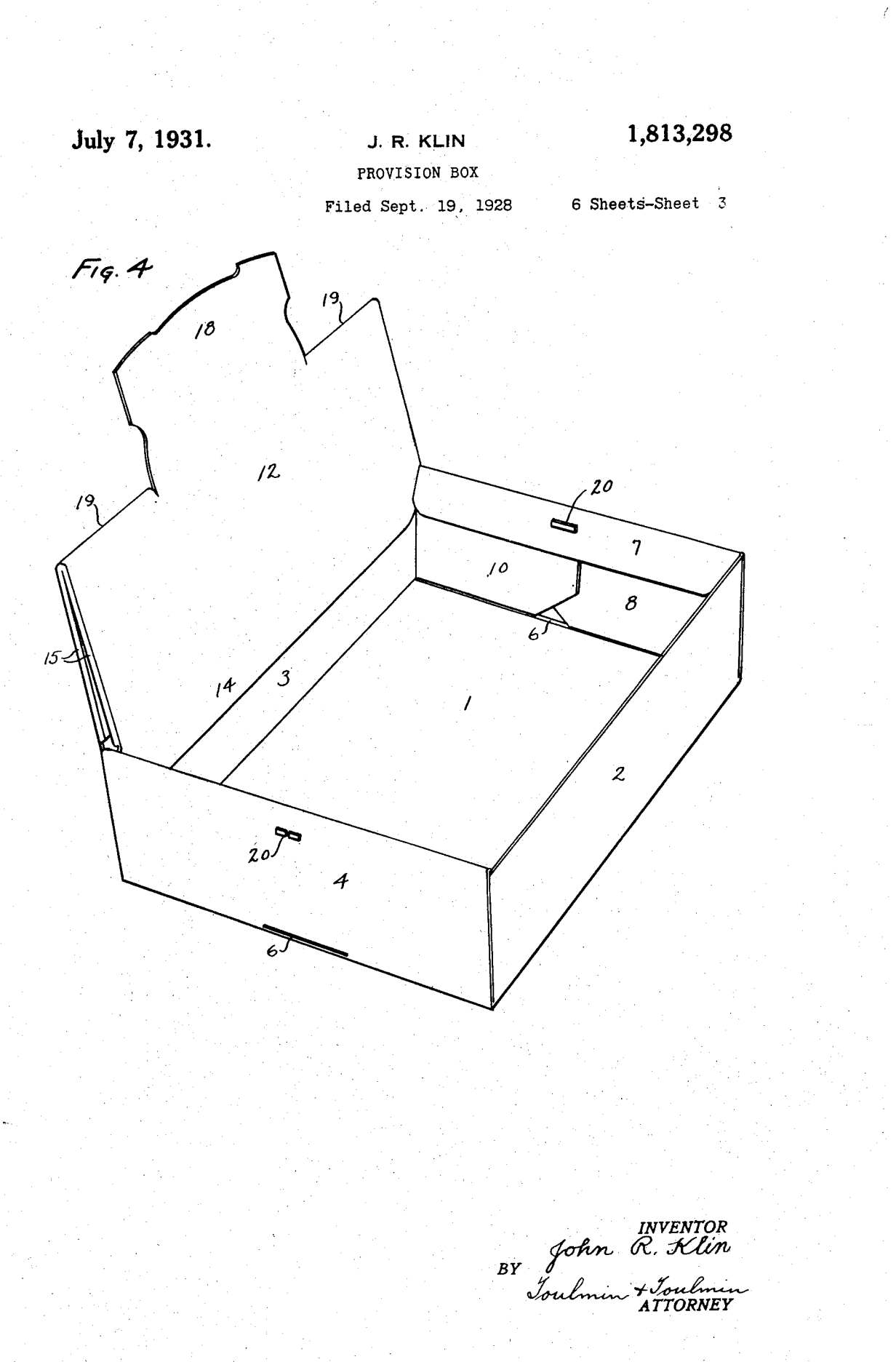

July 7, 1931.　　　J. R. KLIN　　　1,813,298
PROVISION BOX
Filed Sept. 19, 1928　　6 Sheets-Sheet 3

Fig. 4

INVENTOR
John R. Klin
BY Toulmin + Toulmin
ATTORNEY

July 7, 1931.  J. R. KLIN  1,813,298
PROVISION BOX
Filed Sept. 19, 1928  6 Sheets-Sheet 4

INVENTOR
John R. Klin
BY Toulmin & Toulmin
ATTORNEY

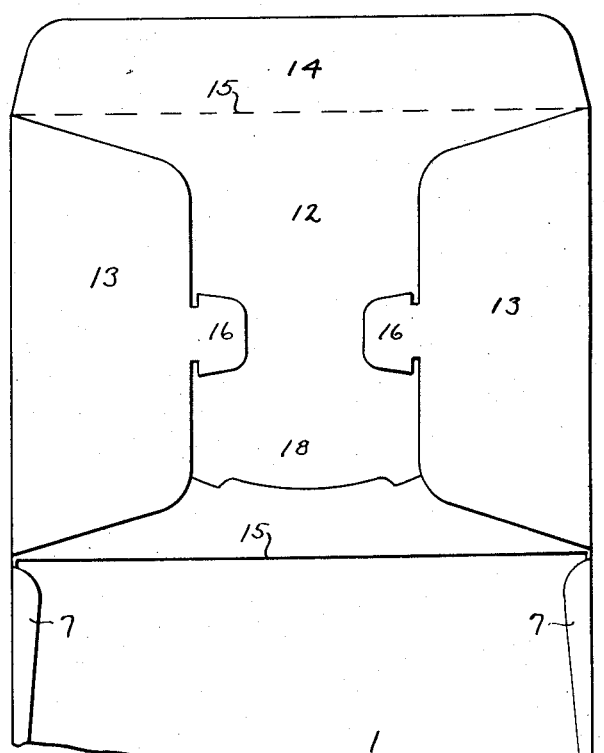
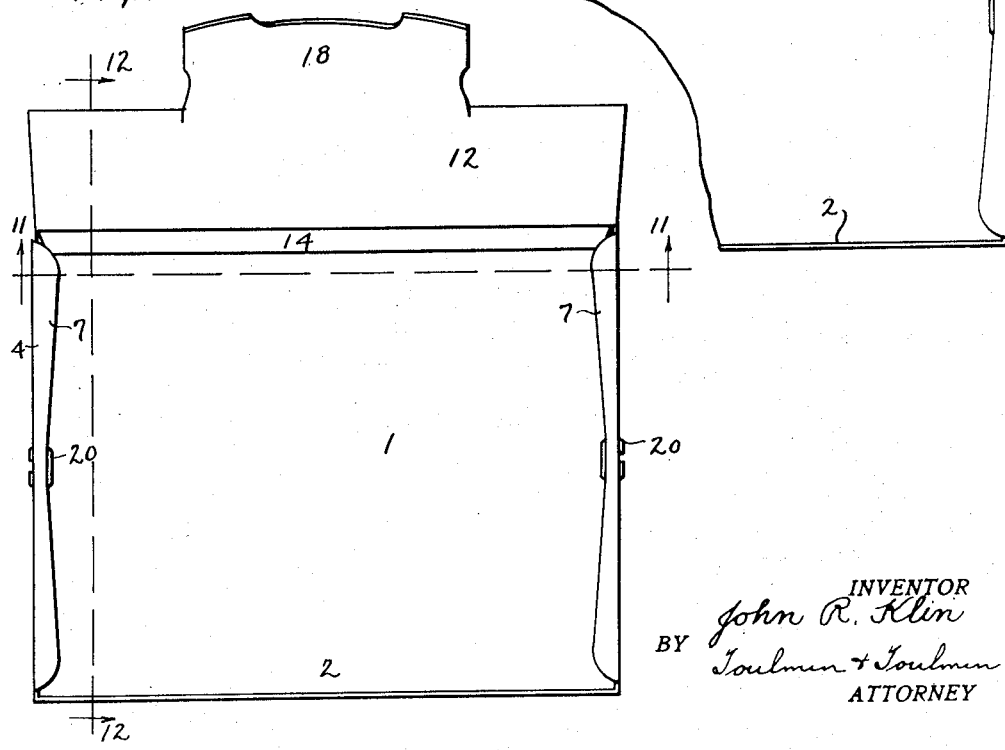

July 7, 1931. J. R. KLIN 1,813,298
PROVISION BOX
Filed Sept. 19, 1928 6 Sheets-Sheet 6
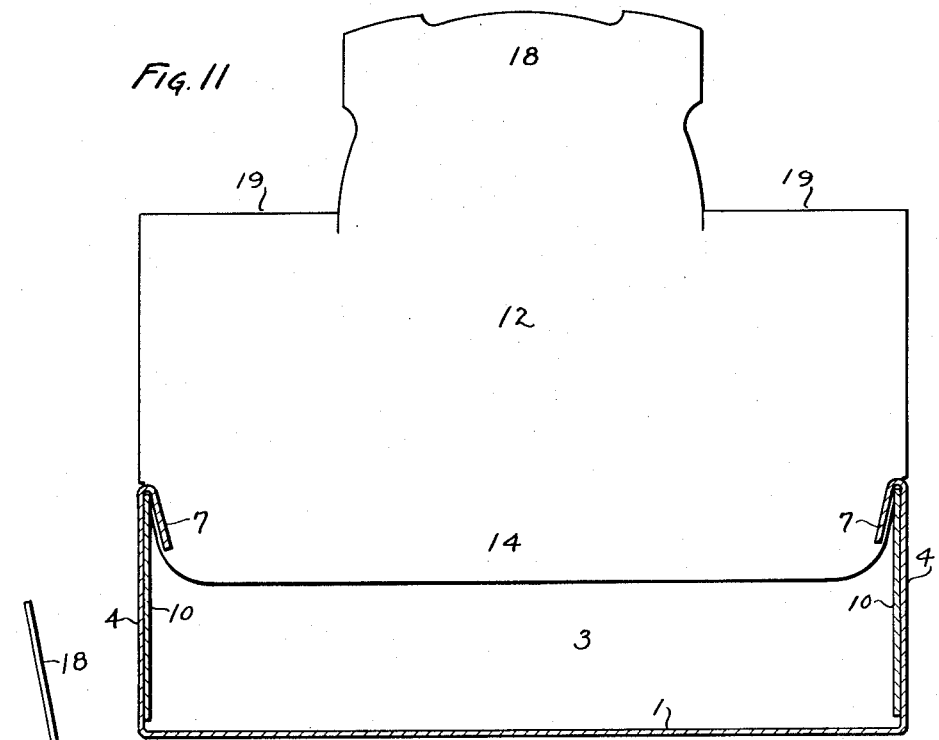
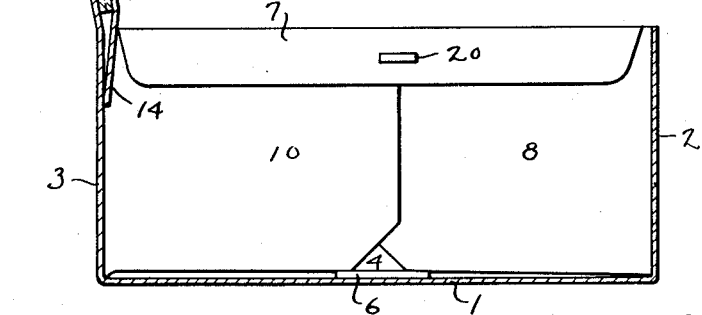
INVENTOR
John R. Klin.
BY Toulmin + Toulmin
ATTORNEY Patented July 7, 1931

1,813,298

UNITED STATES PATENT OFFICE

JOHN R. KLIN, OF DAYTON, OHIO, ASSIGNOR TO THE RIKE FOLDING BOX COMPANY, OF DAYTON, OHIO, A CORPORATION OF OHIO

PROVISION BOX

Application filed September 19, 1928. Serial No. 307,016.

This invention relates to provision boxes, and it especially relates to boxes made from a single blank and adapted, when folded in box position, to contain provisions such as meats.

It is also an object of this invention to provide a box of this type formed of one single piece of box material, from which the blank has been cut and scored for folding purposes.
It is especially an object of this invention to provide a box of this type in which the top, after being opened, can be folded down to form a display container for the goods, and also an announcement of the contents of the box. The lid of the box is formed to have printed thereon advertising matter showing the contents of the box and their nature and quality. Though this display is on the outside of the box lid or cover when it is open the box cover is partly folded so as to fully display the advertising feature of the customer or prospective buyer.

It is also an object of this invention to provide a lid having hook elements to engage the walls of slits in the box to lock the lid on the box.

For the purpose of illustration there is shown in the accompanying drawings a preferred embodiment of this invention, which is used by way of illustration only.

Referring to the drawings:

Figure 4 is a perspective view of the box opened and the lid folded for display purposes.

Figure 9 is a top plan view showing the box with the lid open, but not folded for display purposes.

Figure 10 is a top plan view of the box with the lid open, and folded for display purposes.

Figure 11 is a section on the line 11—11 of Figure 10.

Figure 12 is a section on the line 12—12 of Figure 10.

The box, the subject of the present invention, is made of a single piece of cardboard, or other suitable material. The cardboard is first formed into a box blank, such as that shown in Figure 1, in which the different parts are marked off from each other. The numeral 1 is used to designate the bottom part of the box, while 2 reperesents the front, and 3 the rear of the box when the blank is folded in box form.

Figure 1:
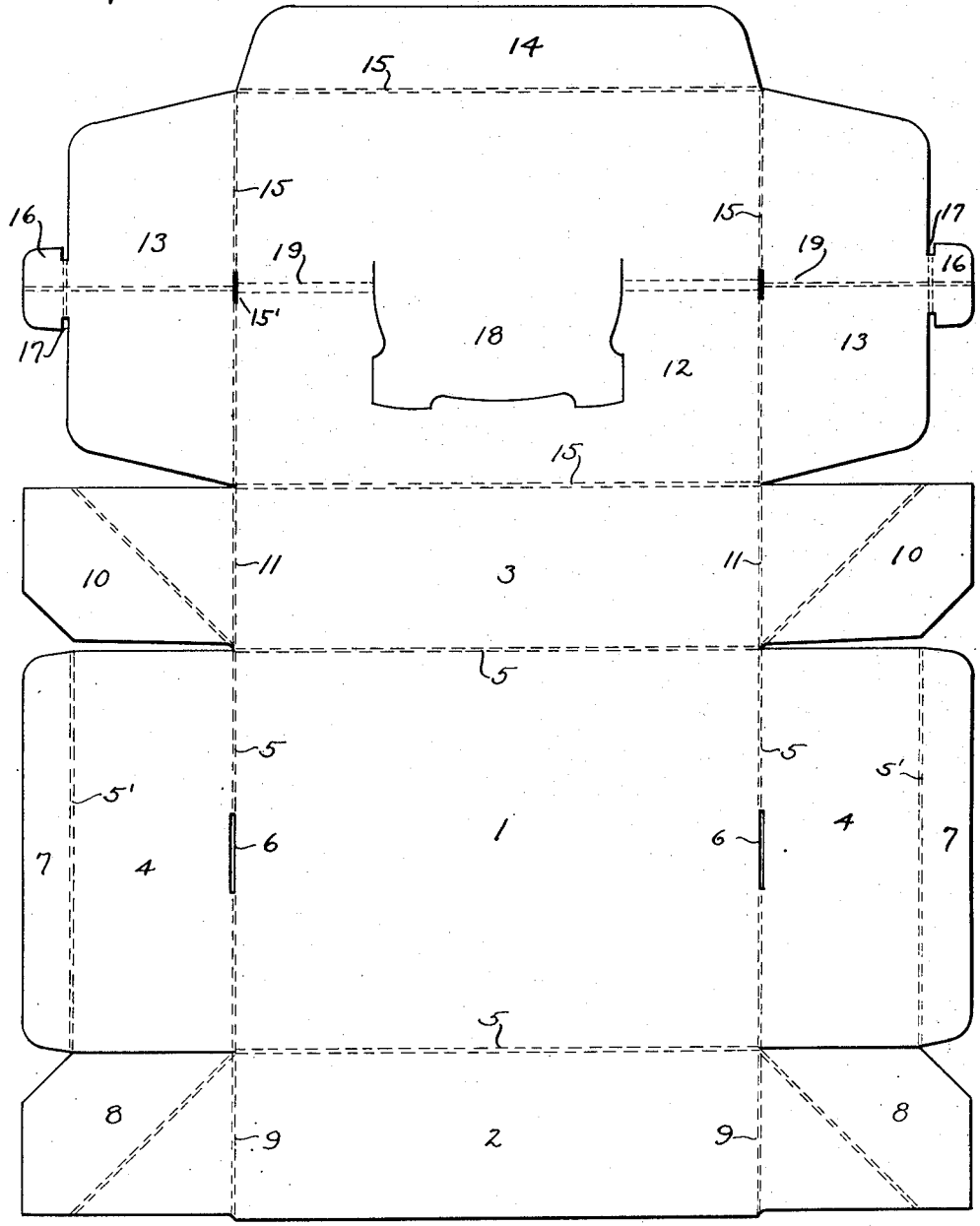
Figure 1 is a box blank from which the completed box is formed.
Figure 2:
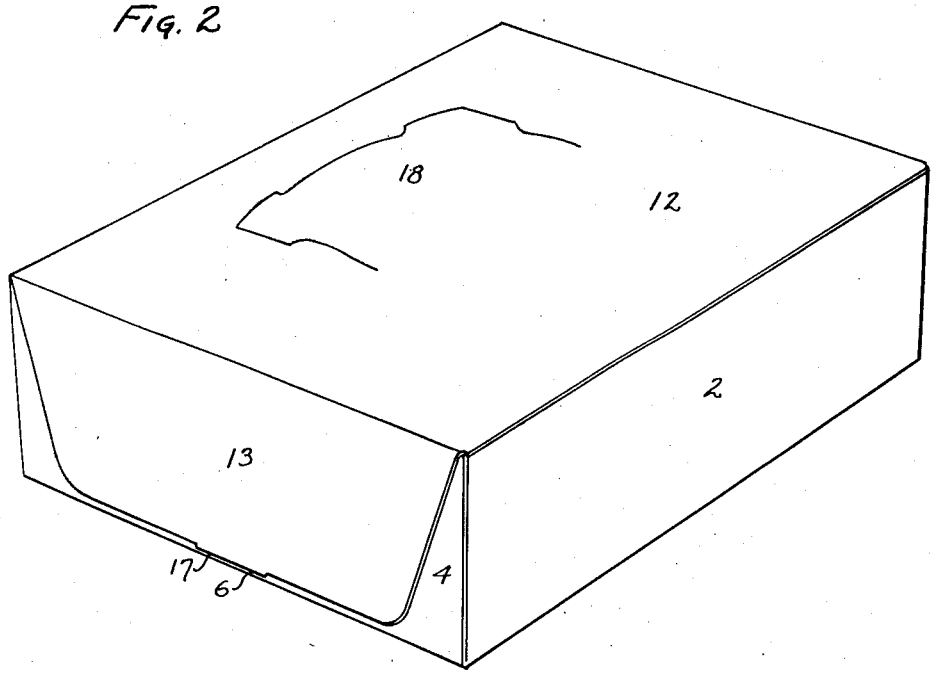
Figure 2 is a view showing the completed box.
Figure 3:
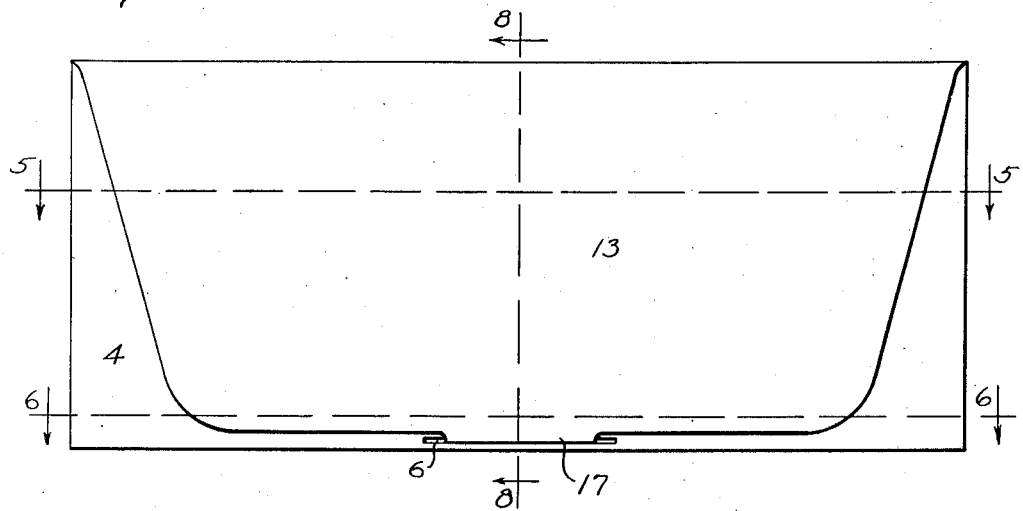
Figure 3 is an end view of the box as shown in Figure 2.
Figure 5:
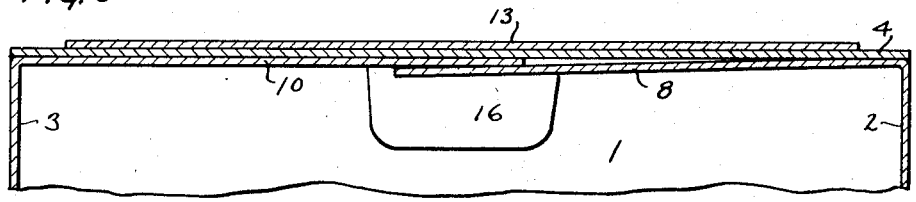
Figure 5 is a section on the line 5—5 of Figure 3.
Figure 6:
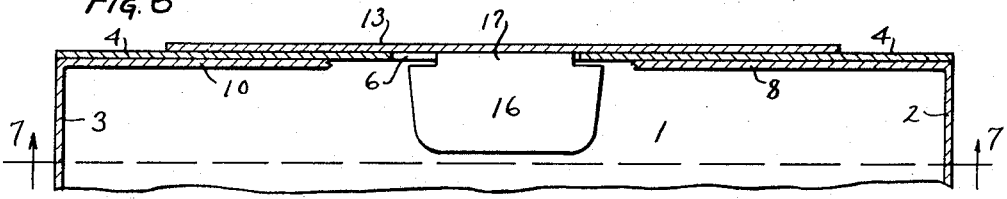
Figure 6 is a section on the line 6—6 of Figure 3.
Figure 7:
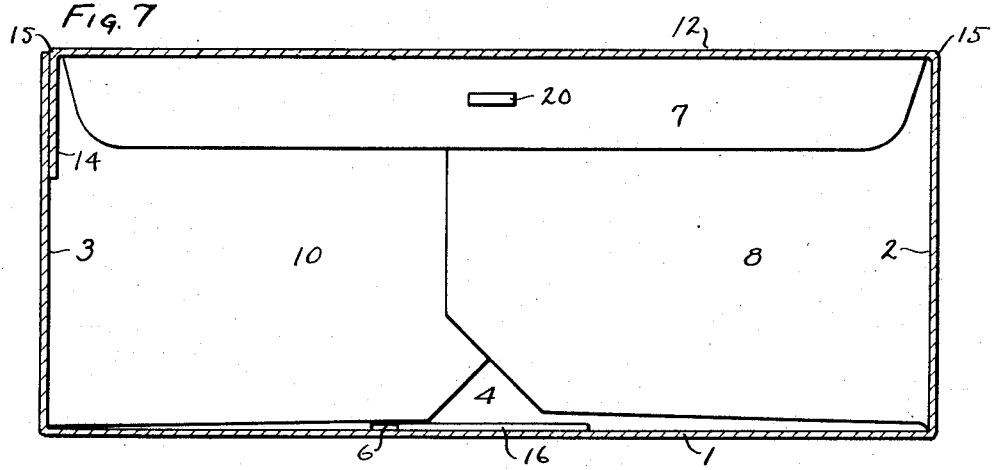
Figure 7 is a section on the line 7—7 of Figure 6.
Figure 8:
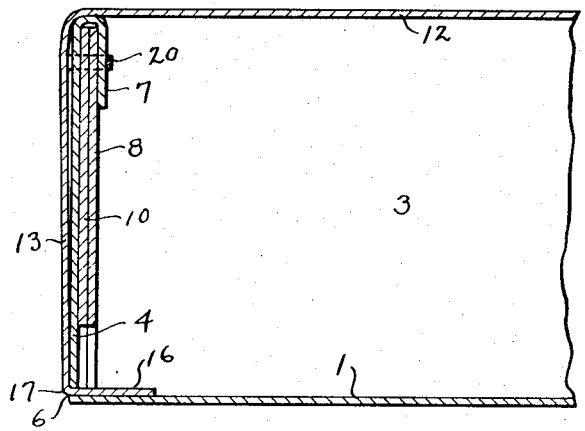
Figure 8 is a section on the line 8—8 of Figure 3.

The end parts of the box are indicated by the numeral 4, and are represented as flaps, as shown in Figure 1. The score line which separates the ends and the sides of the box is indicated by the numeral 5. The bottom of the box is shown here as being rectangular, but may be square, or of any other suitable form.

Near the center of each end of the box bottom, and on the score line between the bottom and the ends, are slits 6. These slits are adapted to be used in connection with the closing of the lid.

On each side of the end part 4, remote from the bottom of the box, there are flaps 7. These flaps are adapted to be folded for the purpose of forming a part of the box closure. The ends 4 and the flaps 7 are separated from each other by means of score lines similar to the score lines 5'.

At each end of the front part of the box 2 there is a flap member 8. These flap members are adapted to fold in and to form part of the ends of the box, in cooperation with similar parts found on the part 3 of the blank. These flaps 8 are separated from the main part of the box front by means of scores 9. The back part of the box has similar flaps 10 and separated from the rear of the box by score lines 11. In the formation of the box from the blank these flaps 10 are bent inward to overlap with flaps 8 to form a part of the ends of the box and fit within the end members 4.

The cover part of the box is indicated by the numeral 12, which has on each end thereof flaps 13, which may be properly called end flaps, and they cooperate with the ends 4 when the box is closed and fit without the ends 4. On the outside of the box lid 12 there is a flap 14. The top of the box proper is separated from the adjacent parts by the score lines 15.

On the outside of each of the flaps 13 there is a tab member 16, which is connected to the main part of the flap 13 in such a way as to form notches 17 on each side. These tabs are adapted to fit within the slots 6 when the box is closed, and the tabs are moved longitudinally in the slots 6 so as to cause the shoulder formed by the notch 17 to engage one part of the box adjacent the slot 6.

In the central part of the box lid or cover there is a portion cut out, indicated by the numeral 18. The cut-out portion is near the rear of the box and is continuous with the front part of the box.

Across the longitudinal center of the lid, including the flaps 13 and the tabs 16, are two score lines 19. These score lines extend from the slit which marks off the part 18 to the ends of this part of the box blank. The purpose of these score lines is to permit the box lid to be bent down when it is open so as to form a kind of a display card, as shown in Figure 4. The front part of the lid with the flap 14 is bent down and caused to engage behind the flap 7 when the box is in assembled condition. Any printed matter or display matter is placed upon the box lid, on the part indicated by the numeral 18, and the front part of the lid in such a way that when the box is open the matter will be in the view of the customer or prospective purchaser. In order that the parts of the blank may fold easily and not buckle at the points where the score lines 15 cross the score lines 19 there are slots 15'.

The box is formed after being cut into blanks, as indicated above by bending each of the side parts up and the flaps 8 and 10 in so as to form part of the box end. After the flaps 8 and 10 are bent in and partly overlap each other the ends 4 are bent up and the flaps 7 bent down and over the ends of the flaps 8 and 10. When in this position the parts are fastened together by staples or brads, as indicated by the numeral 20, shown in Figure 4.

For the purpose of closing the box thus formed the lid 12 is bent down and the part 14 is slipped within the box between the front part of the box and the front edges of the flaps 7.

The flaps 13 are bent down over the end of the box and the tabs 16 are slipped in the slits 6, and when in that position the parts 16 are slightly moved in relation to the box so that the body of the top will slip within the notches 17 so that the flaps 13 are held in firm engagement with the end of the box, thereby holding the box locked until it is desired to be opened.

I desire to comprehend within my invention such modifications as may be clearly embraced within my claims and the scope of my invention.

Having thus fully described my invention, what I claim is new and desire to secure by Letters Patent, is:

1. In a box having along each end thereof adjacent the bottom a slit, a lid integral with said box, said lid having on each end thereof and separated therefrom by score lines an end flap and a tab having a notch adjacent the flap, said tab being adapted to engage said slits to hold the box and the lid in engagement with each other, said lid also having formed therein and integral therewith a central flap, double score lines extending from said central flap to the ends of said lid and across the end flaps and the tabs as a single score line so that the end flaps and the tabs may be bent over on the inside of the lid and the upper part of the lid, then bent down over the back part of the lid so that the front part of the lid will engage the upper part of the box and form with the central flap a display card.

2. In a box having ends with folded down upper edges and a slit along the lower edge of each end, a lid pivotally attached thereto, said lid having on one side a flap and on each end thereof a flap to engage the side of the box, and on each end flap a notched tab adapted to engage in said slits to hold the lid in locked relation thereto, a central flap cut from one edge of said lid, double score lines extending from said central flap to the flaps and across the flaps and tabs as a single line, said flaps and tabs being bent inward in contact with the inside of the lid and the front side of the lid being bent down in engagement with the upper side of the box with the side flap behind the turned down edges of the ends so that the front part of the lid and the central flap form an advertising card.

In testimony whereof, I affix my signature.

JOHN R. KLIN.